April 23, 1963 A. E. BREWSTER 3,087,073
ELECTRIC PULSE FREQUENCY DIVIDERS
Filed Feb. 25, 1960 4 Sheets-Sheet 1
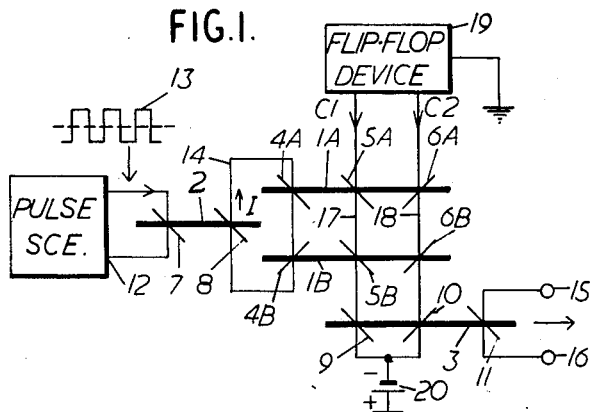
Inventor
A. E. BREWSTER
By C. H. Suydam
AGENT April 23, 1963 A. E. BREWSTER 3,087,073
ELECTRIC PULSE FREQUENCY DIVIDERS
Filed Feb. 25, 1960 4 Sheets-Sheet 2

Inventor
A.E. BREWSTER
By C.H. Suydam
AGENT

April 23, 1963     A. E. BREWSTER     3,087,073
ELECTRIC PULSE FREQUENCY DIVIDERS
Filed Feb. 25, 1960     4 Sheets-Sheet 3
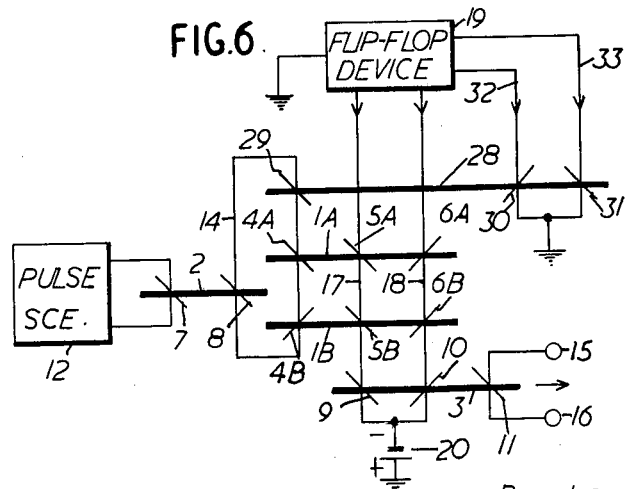
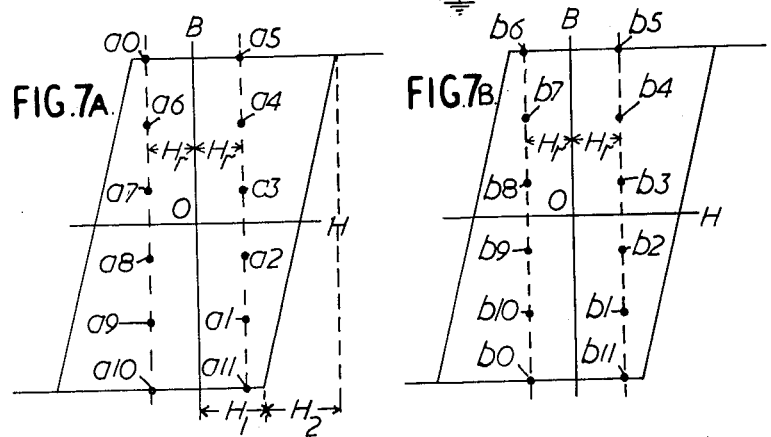
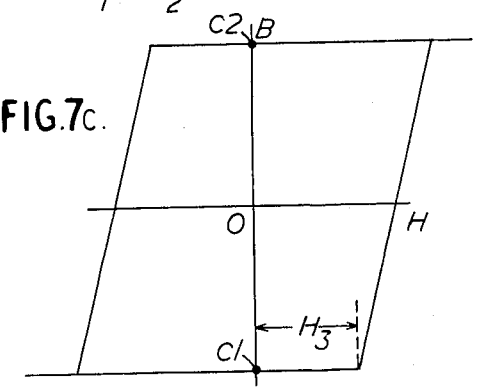
*Inventor*
A. E. BREWSTER

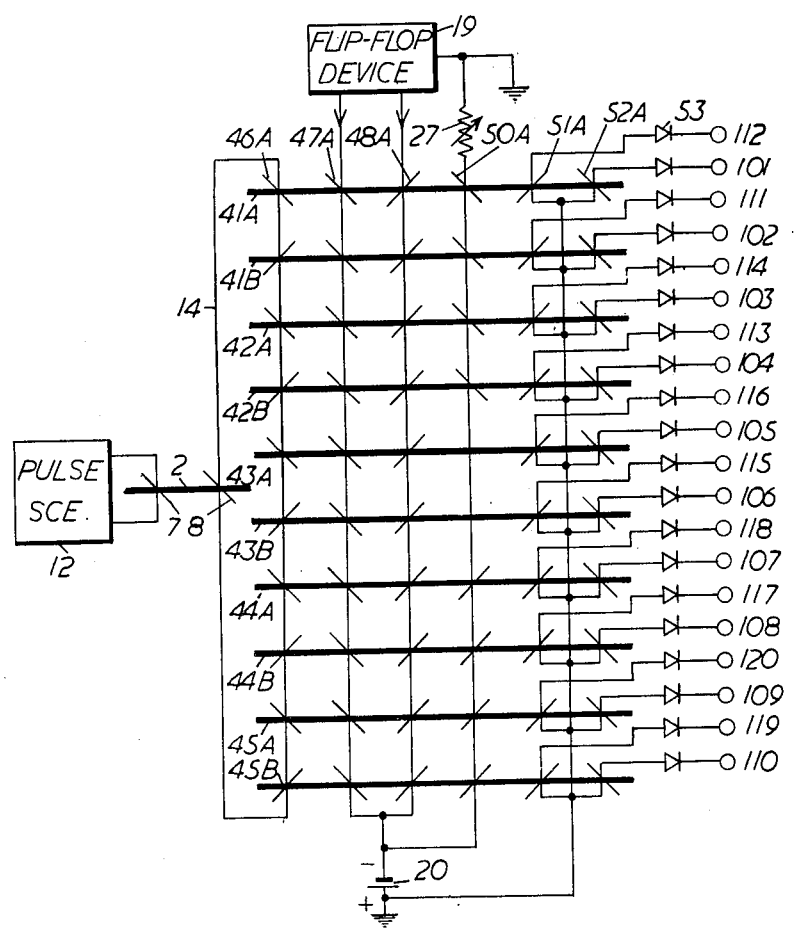

United States Patent Office 3,087,073
Patented Apr. 23, 1963

3,087,073
ELECTRIC PULSE FREQUENCY DIVIDERS
Arthur Edward Brewster, London, England, assignor to International Standard Electric Corporation, New York, N.Y.
Filed Feb. 25, 1960, Ser. No. 10,972
Claims priority, application Great Britain Mar. 6, 1959
19 Claims. (Cl. 307—88)

The present invention relates to electric frequency dividers or counters of the kind employing cores of square-loop ferromagnetic material.

By "square-loop" material is meant ferromagnetic material in which the remanent flux is substantially equal to the saturation flux, and in which the coercive force is relatively large. Several ferrite materials have these characteristics.

When the flux in a magnetic core is changing, the electromotive force V generated at any instant in a winding of $m$ turns is given by $V=m.db/dt$ where $b$ is the variable flux linking the winding and $db/dt$ is the rate of change of the flux at the instant concerned. If $\varphi$ is the total change in flux when the saturation of a square-loop magnetic material is reversed, and if the reversal takes place in such manner that $db/dt$ is constant during the period T during which the change of flux occurs, the $db/dt=\varphi/T$ and $VT=m.\varphi$. This means that, under the conditions stated, a flux reversal generates in a winding of $m$ turns a pulse of substantially constant voltage V and duration T, and vice-versa. Thus the "volt-second product" VT of the pulse produced by the reversal of the saturation of the material is uniquely determined by the product $m.\varphi$ which will be called the "change in flux linkage." If the pulse of defined volt-second product VT is applied to a winding of $p$ turns on a second similar core, the change in flux produced in the second core is $m\varphi/p$. If $p$ is less than $m$, since the total change of flux cannot exceed $\varphi$, there will be some energy left in the pulse after the flux of the core has been reversed; if $p=m$ then the energy of the pulse is just used up in completely reversing the flux of the second core; if $p$ is greater than $m$, then only the fraction $m\varphi/p$ of the total possible flux change $\varphi$ of the second core occurs.

Arrangements have been described already, in which square-loop magnetic cores are used as pulse counters or frequency dividers. Each pulse is represented by a defined volt-second product, and is applied to the counting core, driving it through a small proportion of its total available change of flux. Assuming that the core is initially saturated negatively, and that each input pulse traverses 1/$n$th of the total flux, the core will reach positive saturation after $n$ pulses, and this condition may be recognised as a count of $n$. It is convenient to use the reversal of a second core to generate the pulse of defined volt-second product.

In general, an output winding on the driving core is connected to an input winding on the counting core so that the total change of flux linkage produced by fully switching the driving core must generate a corresponding change of flux linkage in the counting core. Assuming a one-turn driving winding and identical cores, it will be evident that, with an $n$-turn counting winding the counting core will traverse 1/$n$th of its total flux for each reversal of the driving core. The terms "ladle" and "bucket" have been aptly used to describe the driving and counting cores, respectively.

After generating each useful pulse the ladle core must be reset, and hence must be isolated from the bucket core during resetting. This is effected by including a diode in the link circuit, and it is the necessity for this diode which represents one of the major disadvantages of this known circuit. The forward voltage drop across the diode effectively reduces the ladle core output voltage, and hence reduces the defined volt-second product. To make the diode impedance negligible it would be necessary to design the magnetic circuits for a very much higher impedance than would normally be desirable, involving large numbers of turns on the windings. Compensation for the diode voltage drop could be made effective at only one chosen value of core switching speed, although the basic principle is not inherently speed-dependent. Compensation would in any case, be made difficult by the effect of temperature changes on the diode characteristics. Any consequent variation in the ultimate volt-second output would make the count uncertain, and hence the value of $n$ must be kept small.

The object of the invention is to improve this known type of frequency divider, so that the above-mentioned objections are avoided, and at the same time to increae the dividing factors per stage without reducing the tolerances of the circuit elements necessary for reliable counting.

The invention will be described with reference to the accompanying drawings, in which:

FIG. 1 shows a schematic circuit diagram of an embodiment of the invention;

FIGS. 2A, 2B, 3A and 3B show graphical diagrams used in explaining the operation of FIG. 1;

FIG. 5 shows a graphical diagram used in explaining the operation of FIG. 4;

FIG. 6 shows a schematic circuit diagram of a further embodiment of the invention;

FIGS. 7A, 7B and 7C show graphical diagrams used in explaining the operation of FIG. 6; and FIG. 8 shows a schematic circuit diagram of a pulse distributor according to the invention.

Figure 3A:
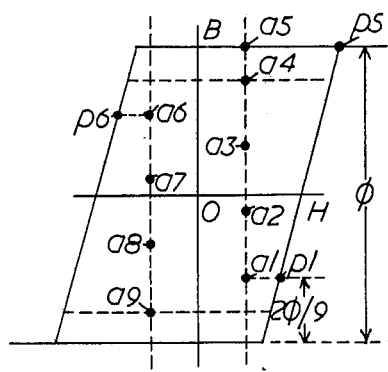

The principal feature by which the arrangement of the present invention differs from the known arrangement explained above is that the counting core is replaced by two similar counting cores which are caused to count alternately. The simplest arrangement is shown in FIG. 1, in which 1A and 1B are the two counting cores, 2 is the driving core and 3 is an output core. All the cores are alike and are composed of a suitable square-loop magnetic material, such as a ferrite material. Each core is shown diagrammatically as a horizontal rod, though in practice it will usually be of toroidal form. A winding on a core is shown as a short inclined line sloping upwards to the left to indicate a winding wound "straight" and to the right to indicate a winding wound "reverse." A vertical line through the intersection of a winding with a core indicates a conductor with which the winding is in series, and a current flowing downwards through such a conductor produces a flux from left to right in the core, when the winding is wound straight.

The cores 1A and 1B have respective driving windings 4A, 4B, and bias windings 5A, 5B and 6A, 6B as shown. The driving core 2 has an input winding 7 and an output winding 8. The output core 3 has two input windings 9 and 10 and an output winding 11. The windings 4B, 6A, 6B and 10 are wound reverse, and all the others are wound straight.

A source 12 of periodic waves or pulses is connected to the input winding 7. The pulses may, for example, be alternate positive and negative rectangular pulses as indicated at 13. The output winding 8 is connected by a link conductor 14 in series with windings 4A and 4B. The conductor 14 should have negligible resistance. The output winding 11 is connected to two output terminals 15 and 16.

The windings 5A, 5B and 9 are connected in series with a bias conductor 17 and windings 6A, 6B and 10 are connected in series with a second similar bias conductor 18. The upper ends of conductors 17 and 18 are connected to a bistable flip-flop device 19 of some suitable conventional type, and the other ends are connected in common to the negative terminal of a direct current source 20, the positive terminal of which is connected to ground. The flip-flop device may, for example, comprise two cross-connected transistors the collector electrodes of which are connected respectively to the conductors 17 and 18, so that the source 20 provides the collector current for both. The precise arrangement is immaterial, the requirement being that when the device 19 is in one condition the bias currents supplied downwards to conductors 17 and 18 are respectively C1 and C2, and when the device 19 is in the other condition C1 and C2 are interchanged.

The windings 4A and 4B should have the same number of turns which should be $n$ times the number of turns of the winding 8. In practice the winding 8 could have only one turn. For example, $n$ may be 5. The number of turns of the winding 7 is not important so long as it is sufficient to enable the core 2 to be saturated alternately positively and negatively by the input pulses 13. The bias windings 5A, 5B, 6A and 6B should all have the same number of turns, chosen as will be explained later. The choice of the numbers of turns of the windings 9, 10 and 11 also will be explained later.

The operation of FIG. 1 will be explained with reference to FIGS. 2A and 2B which respectively show the two hysteresis curves for the counting cores 1A and 1B of FIG. 1. These curves are substantially identical, and for convenience the field-strength H will be assumed to be expressed in ampere-turns. This is allowable since all the cores in FIG. 1 are assumed to be identical.

It will also be assumed that the circuit of FIG. 1 is arranged to count groups of 10 cycles of the input wave 13, and that it is in the condition when it has just completed one count. In that case the flip-flop device 19 is in the condition such that the current C2 is greater than the current C1. Then if $r$ is the number of turns of each of the windings 5A, 6A, 5B and 6B, each of the cores 1A and 1B has applied to it a negative bias field (that is a field from right to left) $Hr=r(C_2-C_1)$. Assuming also that both the cores 1A and 1B are already saturated negatively (that is with flux from right to left), then the cores 1A and 1B will be in the conditions represented by the points $a10$ and $b10$ in FIGS. 2A and 2B because of the negative bias $Hr$ applied by the flip-flop device 19. The negative bias $Hr$ should be slightly less than the negative field $H_1$ corresponding to the corner 21 of the hysteresis curve (FIG. 2A or 2B). The driving core 2 is in the condition of negative saturation.

When the first positive half-cycle of the next count of the wave 13 appears, the saturation of the driving core is reversed, and a current I is supplied from winding 8 to windings 4A and 4B in the direction indicated by the arrow. If it be assumed that winding 8 has one turn, then the change in flux linkage is $\varphi$, where $\varphi$ is the total flux change produced by the complete reversal of the saturation of any of the cores.

The next negative half cycle of the input wave 13 restores the condition of saturation of the driving core 2, and an output current I in the opposite direction is supplied to conductor 14. Thus in response to each complete cycle of the input wave there are supplied to the output conductor in succession a positive output pulse and an equal negative output pulse each pulse being equivalent to a change of flux-linkage of $\varphi$. These two pulses will be referred to as the forward driving pulse and the reverse driving pulse, respectively. One pair of driving pulses then corresponds to each complete cycle of the input wave.

It will be assumed that winding 8 has one turn, and that windings 4A and 4B have five turns. Then since each driving pulse produces a change of flux-linkage of $\varphi$, it follows that the maximum change of flux which can be produced by a driving pulse in core 1A or 1B is only $\varphi/5$.

Since the winding 4B is wound reverse, the first forward driving pulse moves the point $b10$ (FIG. 2B) to the left, and thus cannot appreciably change the flux in core 1B. However, in the case of core 1A, winding 4A is wound straight, so that the effect of the driving pulse is to move the point $a10$ (FIG. 2A) to the right until it reaches the corner 22 of the hysteresis curve. So far no change of flux has occurred, and so the condition of the core 1A is shifted up to the point $p1$ before the energy of the driving pulse is expended. The point $p1$ corresponds to a reduction of the negative saturation flux of $\varphi/5$.

The change in flux in the core 1A causes switching pulses to be generated in windings 5A and 6A which tend to reduce current C2 and increase current C1. The flip-flop device 19 should be designed on conventional lines so that these switching pulses cause the device 19 to be switched to the opposite stable condition, thereby interchanging the currents C1 and C2. The bias field in the cores 1A and 1B is now $+Hr$ instead of $-Hr$. Therefore on the disappearance of the first forward driving pulse, core 1A will take up the condition represented by the point $a1$, and core 1B will take up the condition represented by the point $b0$.

The first reverse driving pulse supplied to windings 4A and 4B is now in the opposite direction, and so this time core 1A cannot be appreciably affected since the driving pulse is now in the wrong direction, but core 1B, whose condition is represented by the point $b0$, FIG. 2B, is switched to the point $q1$ corresponding to a reduction of flux of $\varphi/5$. On the disappearance of the driving pulse core 1A assumes the condition represented by the point $a1$, and core 1B assumes that represented by the point $b1$. It will be noted that the switching pulses produced by the change in flux in the core 1B are now in the wrong direction to switch the flip-flop device 19, so that the bias remains at $+Hr$.

Thus it will be seen that in response to one complete cycle of the input wave 13, the conditions of cores 1A and 1B are represented respectively by the points $a1$ and $b1$ in FIGS. 2A and 2B. This corresponds to a count of "one."

It will now be clear that in response to four further pairs of driving pulses the conditions of the cores 1A and 1B will be moved successively to the points $a2$, $a3$, $a4$ and $a5$, and $b2$, $b3$, $b4$ and $b5$. The points $a5$ and $b5$ are on the top line of the hysteresis curves and correspond to the condition in which the bucket has been just filled by the ladle.

It should be explained that in the case of points $a4$ and $b4$ (and similarly for any of the earlier pairs of points), the core 1A is switched by the fifth forward driving pulse, and not the core 1B, because the point $a4$ is nearer to the right hand side of the hysteresis curve than the point $b4$ is to the left-hand side, so the energy of the driving pulse is used up in switching core 1A before the current can increase sufficiently to start switching the core 1B. However, in response to the sixth forward driving pulse, although the point $a5$ is moved to the right, no appreciable change can occur in the flux of core 1A, so point $b5$ can now be moved beyond the corner 21, so that the flux of core 1B is reduced by $\varphi/5$, the condition of the core being moved to the point $q6$.

The switching pulses generated by the windings 5B and 6B are now in the right direction to switch back the flip-flop device 19, so that the bias $Hr$ is again negative. After the disappearance of the sixth forward driving pulse therefore, the conditions of the cores 1A and 1B will be represented by the points $a0$ and $b6$.

The sixth reverse driving pulse now switches core 1A so that its condition is represented by the point a6, core 1B not being affected. Thus after a count of "six" the conditions of the two cores are represented by the points a6 and b6.

It will be clear that the next four pairs of driving pulses will cause the cores 1A and 1B to assume successively the conditions corresponding to the points a7, a8, a9 and a10, b7, b8, b9, b10. After the count of "ten" therefore, the circuit is in the condition from which the count started. Further cycles of ten are then counted in like manner.

It will be noted that during the process of filling the bucket, cores 1A and 1B are switched respectively by the forward and reverse driving pulses, but during the emptying of the bucket the functions of the driving pulses are interchanged.

It will be seen that the pulses generated by the reversal of the flip-flop device 19 pass through the windings 9 and 10 of the output core 3. These windings should have equal numbers of turns, the number being sufficient to ensure that the saturation of the core 3 is reversed each time that the condition of the flip-flop device 19 is reversed. Then a succession of output pulses of defined volt-second product can be obtained at terminals 15 and 16, these pulses being alternately positive and negative. These output pulses can be used directly to drive a second dividing stage similar to FIG. 1, in which, however, the driving core 2 can be omitted since its place is taken by the output core 3.

It should be pointed out that in order that the circuit shall operate as described it is necessary that the magnetic material should have sufficiently wide hysteresis loop such that the field $H_1$ is not less than half the field change $H_2$ corresponding to the change of flux $\varphi$ which occurs when the saturation of the core is completely reversed (see FIG. 2B). Further, the bias field $Hr$ should lie between $H_1$ and $\frac{1}{2}H_2$. These requirements are usually quite easy to meet and the values are not critical.

It will be noted that while the ratio $n$ of the number of turns of the windings 4A and 4B to the number of turns of the winding 8 is equal to 5 in the above example, the dividing ratio of the counting stage is 10, or $2n$. This is double the dividing ratio obtainable with the already known arrangement under equivalent conditions. The reason for this is that in the known arrangement the contents of the bucket are thrown away after it has been filled, while in the arrangement according to the invention, the contents of the bucket are ladled out again, after it has been filled, to provide a second counting cycle.

In principle, $n$ could have any desired value, but in practice variations in materials will set an upper limit to $n$ which can be used if reliable counting is to be obtained.

Referring again to FIGS. 2A and 2B, suppose that the flux-change for a complete reversal of the saturation of the cores 1A and 1B is $\varphi+d\varphi$, where $d\varphi$ is small, while for core 2 the flux change is still $\varphi$. Then it will be seen that after a count of five, the points a5 and b6 are not on the top line of the hysteresis curve, but on a line at a distance $d\varphi$ below the top line. The sixth forward driving pulse will now switch core 1A so that its condition is represented by the point a5 (FIG. 2A) on the top line, but only the amount $d\varphi$ of the available flux-linkage is expended. The remainder namely $\varphi/5-d\varphi$ is then expended in switching core 1B, and on the assumption that the corresponding switching pulse can still reverse the flip-flop device 19, it will be evident that conditions of cores 1A and 1B will, after counting "six," be at the points a6 and b6 as before. A similar modification occurs at the lower end of the hysteresis curves, and the counter still counts "ten." However, if $d\varphi$ is large enough, so that the reduced driving pulse of flux change $\varphi/5-d\varphi$ cannot switch the flip-flop device 19, then this device will be switched on the next count and the counter then counts "twelve."

The arrangement may be slightly modified to permit the counter to count an odd number. Suppose, for example, that it is desired to count 9 instead of 10. Then the ratio $n$ between the number of turns of the windings 4A and 4B and the number of turns of the winding 8 is chosen to be 4½, (for example by providing windings 4A and 4B with 9 turns and winding 8 with 2 turns). The operation of the circuit will be explained with reference to FIGS. 3A and 3B, which are similar to FIGS. 2A and 2B except that the quantum flux-linkage corresponding to the ladle is now $2\varphi/9$. At the end of the previous count of 9 the cores 1A and 1B are in the conditions represented by the points a9 and b9 respectively, the bias being $-Hr$ in each case. These points are each on a line half a quantum ($\varphi/9$) above the bottom line of the hysteresis curve. When the first forward driving pulse arrives, it completes the negative saturation of the core 1B by taking the condition of the core to the point q9. Since only half the flux linkage is used up, core 1A is also taken to the condition represented by the point p1, one quantum above the bottom line of the curve. It is assumed that the pulse which switches core 1A is also capable of switching the flip-flop device 14 to the opposite condition, thus reversing the sign of the bias. Thus it will be seen that on the disappearance of the driving pulse, the conditions of cores 1A and 1B will be represented by points a1 and b0 respectively. When the first reverse driving pulse arrives, core 1A will be unaffected, but the condition of core 1B will be taken to the point q1 which is one quantum above the bottom line of the curve. On the disappearance of the driving pulse, the conditions of the cores will correspond to points a1 and b1 respectively, and this corresponds to a count of "one." The count up to "four" then proceeds as described for FIGS. 2A and 2B, and when this count is completed the conditions of the cores will be represented by the points a4 and b4 respectively, each of which is half a quantum below the top line of the curve.

When the next forward driving pulse arrives, the condition of core 1A is taken to the point p5, and that of core 1b to the point q5x, and it will be assumed that the switching sensitivity of the flip-flop device 19 has been adjusted so that it will not respond to the half-quantum switching pulse of core 1b. The conditions of cores 1A and 1B are then represented by the points a5 and b5x after the disappearance of the driving pulse. When the next reverse driving pulse arrives, the condition of core 1B is taken to the point q5 and shifts to b5 on the top line after the disappearance of the driving pulse. Thus on the completion of the count "five" the cores 1A and 1B are left in the condition represented by the points a5 and b5 respectively.

On the arrival of the next forward driving pulse corresponding to count "six," the condition of core 1B is taken to point q5x again. The flux change being a whole quantum this time, the flip-flop device 19 can be changed over so that the bias is again negative. The condition of core 1b is therefore left at the point b6. In response to the next reverse driving pulse, the condition of core 1A is taken to the point p6, and left at the point a6. At the end of count "six" therefore, the cores 1A and 1B are in the conditions represented by the points a6 and b6. Counting up to "nine" then proceeds as previously described, the cores 1A and 1B ending up the original conditions represented by the points a9 and b9.

It will be noted that in this case there are four normal counts going up and four going down, with an extra count corresponding to the points a5 and b5 at the top.

It should be pointed out that if the flip-flop device 19 were equally sensitive on both sides, the arrangement would count "eight."

The adjustment of the sensitivity of the flip-flop device 19 may be achieved in any suitable way. It may be mentioned, however, that if the rate of change of flux linkage in the case of the driving pulses is constant, the pulse voltage will be constant and the difference between a half quantum pulse and a whole quantum pulse is that the former has half the duration of the latter. Thus the adjustment of the sensitivity of the flip-flop device to being switched is best achieved by suitably proportioning the time constants of the circuits through which the switching pulses are applied.

Figure 4:
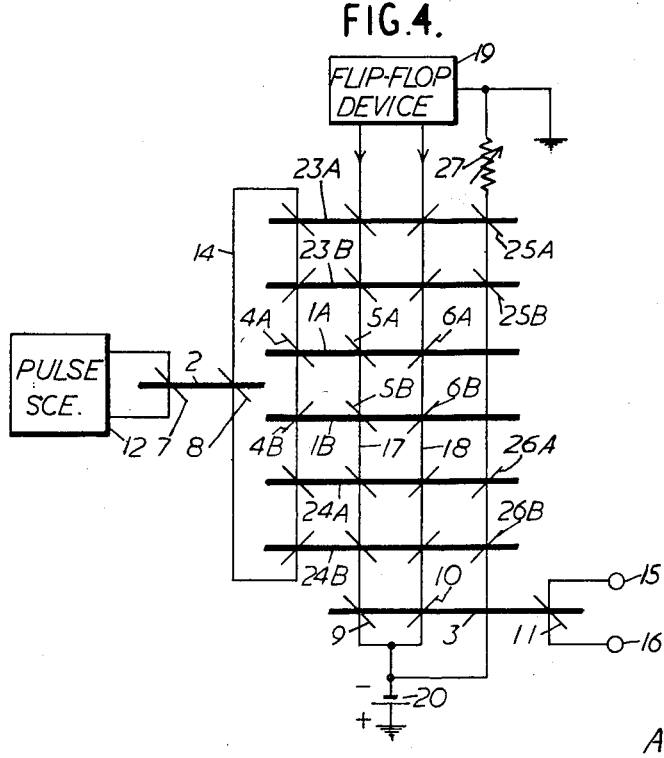
FIG. 4 shows a schematic circuit diagram of another embodiment of the invention.

Referring again to FIGS. 2A and 2B, if the hysteresis curve of the magnetic material is relatively wide, that is, if $H_1$ is several times $H_2$, it is possible to use several pairs of counting cores in the circuit of FIG. 1, so that the count per stage is increased. FIG. 4 shows an example in which three pairs of cores are used. Those elements in FIG. 4 which are the same as corresponding elements in FIG. 1 are given the same designation numbers. In FIG. 4 two additional pairs of cores 23A, 23B and 24A, 24B are shown, with driving and bias windings similarly arranged as for cores 1A and 1B, but cores 23A and 23B have auxiliary bias windings 25A and 25B respectively, wound straight, and cores 24A and 24B have auxiliary bias winding 26A and 26B wound reverse. All the auxiliary bias windings have the same number of turns and are connected in series with an adjustable resistor 27 between the negative terminal of the source 20 and ground, as shown.

FIG. 5 shows on the same diagram the hysteresis curves of the three cores 23A, 1A and 24A. The two full lines marked 1A are the sides of the curve corresponding to core 1A; the two chain-dotted lines marked 23A correspond to the core 23A, and the two dotted-lines marked 24A correspond to the core 24A. The current through the auxiliary bias windings should be adjusted so that the bias field produced is equal to $H_2$. This will have the effect of displacing the hysteresis curve of core 23A to the left by $H_2$ and that of curve 24A to the right by the same amount. FIG. 5 also represents the hysteresis curves for the cores 1B, 23B and 24B.

The arrangement of FIG. 4 counts 30 instead of 10, and its operation will be understood from the following brief explanation with reference to FIG. 5. At the start of a new count, core 23A will be in the condition corresponding to the point $a30$ on the negative bias line. The first forward driving pulse then switches core 23A so that its condition assumes that represented by the point $a1$ as previously explained. It should be noted that neither of the cores 1A or 24A can be affected because both require a larger driving field than core 23A in order to commence any change in flux. Counting then continues as described for FIG. 1 (cores 23A and 23B operating alternately as explained) until at the end of count "five" the condition of core 23A is that represented by the point $a5$. Core 23A is now saturated in the positive direction so no further change in flux can occur. The sixth forward driving pulse can now switch core 1A, and counting continues as before until the tenth forward driving pulse has put core 1A in the position corresponding to the point $a5$. Now core 24A takes over in like manner, and after a count of "fifteen" this core will be in the condition corresponding to the point $a5$. At this time all the counting cores are in a condition of positive saturation.

As explained with reference to FIG. 1, the next forward driving pulse causes core 24A to be switched negatively, and at the same time the flip-flop device 19 is switched over, thereby changing the bias from $+Hr$ to $-Hr$. Counting then continues as described with reference to FIG. 1, until cores 24A, 1A, and 23A are saturated respectively in turn, the final condition after the count "thirty" being represented by the point $a30$.

It will be understood that cores 23B, 1B and 24B operate in like manner alternately with the A-cores, and it has not been considered necessary to show hysteresis curves for these cores in FIG. 5.

It should be mentioned that the hysteresis curve is not actually made up of straight lines as shown in FIG. 5, but the left and right hand sides are slightly curved at the top and bottom. This makes the value of $H_2$ somewhat indefinite, but this is not much importance if the spacing of the hysteresis curves is arranged to be a little greater than $H_2$, in order to ensure that the positive saturation of one core is substantially completed at a field strength slightly less than that necessary to begin the reversal of the next one. It should be noted that by dividing the count between several pairs of cores in this way, the effect of non-linearity in the hysteresis curve is made less than if the whole count were done with one pair of cores.

Figure 3B:
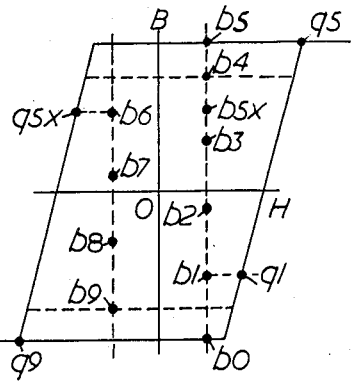

It will be clear that a group of three pairs of cores can be arranged to count an odd number in the manner explained with reference to FIGS. 3A and 3B. For a count of 29, for example, the quantum corresponding to the driving pulse is made equal to $6\varphi/29$, and then the three pairs of core count 29.

It will be evident that more than three pairs of cores could be arranged in the manner of FIG. 4. It is only necessary to proportion the auxiliary bias windings of the cores so that the hysteresis curves of the various pairs are all spaced apart by not less than $H_2$.

FIG. 6 shows a modification of FIG. 1 illustrating another method of dividing by an odd number. The modification consists in the addition of a control core 28 similar to the other cores shown, and used to switch the flip-flop device 19. This device should be modified so that its condition is not affected by pulses from the cores 1A and 1B over conductors 17 and 18.

Core 28 is provided with a driving winding 29 wound straight, and connected in series with the loop conductor 14. Core 28 has two oppositely wound switching windings 30 and 31 connected to the flip-flop device 19 over conductors 32 and 33. The number of turns of the windings 30 and 31 should be so chosen that when the saturation of the core 28 is reversed, so also is the condition of the flip-flop device 19.

The characteristics required for the control core 28 are different from those required for cores 1A and 1B, as will be explained later.

The operation of the circuit of FIG. 6 will be described with reference to FIGS. 7A, 7B and 7C. FIGS. 7A and 7B are the hysteresis curves for cores 1A and 1B respectively, and differ only slightly from FIGS. 2A and 2B respectively. FIG. 7C is the hysteresis curve for core 28. Assuming that the cores 1A, 1B, 2 and 3 and their windings are the same as in FIG. 1, then FIG. 6 will divide by 11. At the end of a complete count of "eleven," cores 1A and 1B are in the conditions represented by the points $a11$ and $b11$ respectively (FIGS. 7A and 7B) and the control core 28 is in the condition represented by the point $c1$ and the bias of cores 1A and 1B is $+Hr$. Counting now proceeds up to a count of "five" as explained with reference to FIGS. 2A and 2B, the cores 1A and 1B then reaching the conditions represented by the points $a5$ and $b5$ respectively. The first forward driving pulse of count 6 cannot switch core 1A, since this is now saturated, but it switches core 28 instead of switching core 1B, thereby changing the bias to $-Hr$. To ensure that core 28 shall be switched instead of core 1B, it is necessary that $H_3$ FIG. 7C, the magnetic field necesary to cause core 28 to begin to be switched, is less than $H_1+Hr$. Also, in order to ensure that it shall not be switched before core 1A has become saturated, $H_3$ must not be less than $H_1+H_2-Hr$.

After the sixth forward driving pulse, therefore, cores 1A and 1B will be in the conditions represented by the points $a0$ and $b6$ respectively, and core 28 will be in the condition represented by the point $c2$. The sixth reverse driving pulse now switches core 1A only since it is in the wrong direction of switch core 1B, so core 1A ends up after the count "six" in the condition represented by the point $a6$. Thus it will be seen that core 1B is now one step behind core 1A. Counting now continues as before, with core 1B behind core 1A, until after the count "ten" the conditions of the cores 1A and 1B are represented by the points $a10$ and $b10$. The eleventh forward driving pulse completes the switching of core 1B, so that it assumes the condition represented by the point $b0$, and the eleventh reverse driving pulse switches core 28 back to the condition represented by the point $c1$ and changes the bias back to $+Hr$. Cores 1A and 1B thus asume the final conditions represented by the points $a11$ and $b11$.

It will be seen that the control core 28, in addition to switching the flip-flop device 19, causes each of the cores 1A and 1B to miss one step in the cycle, and this is equivalent to adding one to the count in the cycle.

The requirement for core 28 can be met in various ways. For example, if all the cores are of the same magnetic material, and if the windings 4A, 4B and 29 have the same numbers of turns, then core 28 could be made larger in diameter than cores 1A and 1B. Alternatively, if all the cores are of the same size, then the desired result could be obtained by giving winding 29 a suitably smaller number of turns than windings 4A and 4B.

It will be evident that, if desired, the output core 3 could be omitted, and the output winding 11 could be put instead on the control core 28. However this arrangement has the objection that all the output power then comes from the pulse source 12, and sufficient power might not be available to operate any further dividing stages connected to the output winding 11. With the arrangements shown in FIGS. 1 and 6 the output power comes from the flip-flop device 19, which can be designed to provide what power is necessary. When several such dividing stages are connected in cascade, each one provides its own output power.

FIG. 8 shows an example of a distributor suitable for selecting the channels in a 20-channel time division communication system. It is an arrangement similar to FIG. 4 in which five pairs of counting cores are used, and in which core 3 is omitted. These cores are designated 41A to 45A and 41B to 45B. These cores have been driving and bias windings arranged as in FIG. 4. These have been designated 46A, 47A and 48A on core 41A only. In addition, all cores except 43A and 43B are provided with auxiliary bias windings designated 50A on core 41A. The auxiliary bias windings are wound straight on cores 41A, 41B, 42A and 42B; and reverse on cores 44A, 44B, 45A and 45B.

Each of the cores is provided with two output windings; one, designated 51A on core 41A, is wound reverse and the other, designated 52A on core 41A, is wound straight.

All the driving windings such as 46A are connected in series with the conductor 14, and in this case have the same number of turns as the output winding 8 on core 2, assuming that all the cores are identical. The auxiliary bias windings such as 50A on cores 42A, 42B, 44A and 44B all have the same number of turns, and the auxiliary bias windings on cores 41A, 41B, 45A and 45B have double the last-mentioned number of turns. All the output windings such as 51A and 52A have the same number of turns, and each is connected between ground and a corresponding output terminal, a rectifier 53 being included in the connection, and directed so as to suppress negative output pulses.

The output terminals are numbered from 101 to 120, to correspond with the channels of the system, and the order in which they are numbered is that in which the positive output pulses appear from the distributor.

The auxiliary bias current is adjusted by means of the resistor 27 so that the five hysteresis curves are spaced apart by at least $H_2$ in the manner illustrated in FIG. 5 (which however only shows three hysteresis curves).

The circuit of FIG. 8 operates in the following way.

Since the driving windings such as 46A have the same number of turns as the output winding 8, the ladle has the same capacity as the bucket, and each pair of counting cores therefore divides by 2. Thus it will be clear that owing to the auxiliary bias, the first pair of forward and reverse driving pulses reverse the saturation of cores 41A and 41B in turn, thus producing positive output pulses in turn from the output terminals 101 and 102. The negative output pulses also produced from the output windings 52A are suppressed by the corresponding rectifiers and do not appear at the output terminals 112 and 111.

It will be clear that subsequent pairs of forward and reverse driving pulses switch the succeeding pairs of counting cores in turn, until after the fifth pair of driving pulses, a total of ten output pulses has been generated in turn at terminals 101 to 110 respectively.

The sixth pair of driving pulses causes the flip-flop device 19 to be switched over and generates output pulses on terminals 111 and 112 respectively, but since now the B-cores operate before the A-cores, core 41B produces the eleventh output pulse at terminal 111, and core 41A produces the twelfth output pulse at terminal 112.

Successive pairs of driving pulses then produce positive output pulses in turn at terminals 113 to 120. The eleventh pair of driving pulses then causes the flip-flop device 19 to be switched back again, and a new cycle is commenced.

It will be evident that the arrangement of FIG. 8 can be extended to divide by even numbers larger than 20, by providing the necessary additional number of pairs of counting cores. The auxiliary bias windings on the additional counting cores should be given an appropriate number of turns so that all the hysteresis curves are effectively spaced apart by $H_2$. It will be clear however, from FIG. 5 that the dividing factor will be limited by the values of $H_1$ and $H_2$. In order to provide a dividing factor $2N$ it is necessary that the counting cores should be so dimensioned and the magnetic material be so chosen that $H_1$ is greater than $(N-1)H_2/2$.

It will be noted that in the arrangement of FIG. 8, a distributor with a dividing factor of $2N$ is obtained by the use of only $N+1$ cores. It should be pointed out, also, that in previous distributor arrangements of this kind a transistor circuit is provided for each channel or pair of channels whereas in the arrangement of FIG. 8, there are no such transistor circuits. This last-mentioned arrangement does, however, require a flip-flop device (19) which may comprise a transistor circuit, but there is only one such circuit. The flip-flop device, however, need not comprise transistors and could take any suitable conventional form.

While the principles of the invention have been described above in connection with specific embodiments, and particular modifications thereof, it is to be clearly understood that this description is made only by way of example and not as a limitation on the scope of the invention.

What I claim is:

1. An electric frequency divider stage comprising two similar cores of square-loop ferromagnetic material, means for applying to driving windings on both cores a train of alternately positive and negative driving pulses of defined volt-second product in such manner that the cores are switched alternately in response respectively to alternate driving pulses, each driving pulse when switching a core being adapted to cause a change of flux therein of a predetermined amount not exceeding the saturation flux, and means for deriving an output pulse in response to the next driving pulse which follows after one of the cores has reached saturation in one specified direction.

2. An electric frequency divider stage comprising two similar cores of square-loop ferromagnetic material, means for applying to driving windings on both cores a train of alternately positive and negative driving pulses of defined volt-second product in such manner that the flux of each core is progressively changed in equal steps from positive saturation to negative saturation and from negative saturation to positive saturation, the flux being changed in the two cores alternately, and means for deriving an output pulse from one of the cores when the flux of that core changes from the saturation value.

3. A divider stage according to claim 1 in which the said means for applying comprises a third core of magnetically saturated ferromagnetic material having an output winding connected in series with the two driving windings, and means for periodically reversing the condition of magnetic saturation of the said third core.

4. An electric frequency divider stage comprising a pair of similar cores of square-loop ferromagnetic material each of which is provided with a driving winding and two bias windings, the two driving windings having the same number of turns, and the four bias windings having the same number of turns, a flip-flop device connected to supply bias currents through the bias windings of the two cores in such manner that when the flip-flop device is in one condition both cores are equally biassed in one direction, and when the flip-flop device is in the other condition both cores are equally biassed in the opposite direction, means for supplying a train of alternately positive and negative driving pulses of defined volt-second product VT to the two driving windings in such manner that each pulse produces equal and opposite magnetic fields in the cores, whereby the flux of one of the cores is changed by a predetermined amount, means for causing the flip-flop device to reverse its condition in response to the next driving pulse which follows after one of the cores has reached saturation, and means for deriving an output pulse in response to the reversal of the condition of the flip-flop device.

5. A divider stage according to claim 4 in which the said means of supplying comprises a third core similar to the first-mentioned cores and normally in a saturated condition, an output winding on the said third core connected in series with the two driving windings and means for periodically reversing the saturation of the said third core.

6. A divider stage according to claim 5 in which the means for periodically reversing comprises a source of periodic waves connected to an input winding on the said third core.

7. A divider stage according to claim 5 adapted to divide by an even number $2n$, where $n$ is an integer, in which the ratio of the number of turns of each driving winding to the number of turns of the output winding is equal to $n$.

8. A divider stage according to claim 5 adapted to divide by an odd number $2n-1$, where $n$ is an integer, in which the ratio of the number of turns of each driving winding to the number of turns of the output winding is equal to $(2n-1)/2$, and in which the flip-flop device is so adjusted that its condition can be reversed in one direction in response to a change of flux linkage of $VT/2$, but requires a change of flux linkage of $VT$ to reverse its condition in the other condition.

9. A divider stage according to claim 5 for dividing by an odd number, in which the means for causing the flip-flop device to reverse its condition comprises a fourth core of square-loop ferromagnetic material having a driving winding connected in series with the driving windings of two first-mentioned cores, and two oppositely wound output windings connected to the flip-flop device in such manner that the condition of the flip-flop device is reversed, when the condition of saturation of the said fourth core is reversed, the characteristics of the said fourth core and the driving winding being so selected that when both the first-mentioned cores have reached saturation, the next driving pulse causes the reversal of the condition of saturation of the said fourth core.

10. A divider stage according to claim 4 in which the means for deriving the output pulse comprises a third core having two oppositely wound driving windings connected in series with the bias winding on the first-mentioned two cores, and an output winding connected to an output circuit, the said driving windings being so proportioned that the reversal of the condition of the flip-flop device causes the reversal of the saturation of the said third core.

11. An electric frequency divider comprising a plurality of pairs of cores of square-loop ferromagnetic material, all the cores being similar, and each core being provided with a driving winding and a pair of oppositely wound bias windings, a two-condition flip-flop device arranged to supply bias currents to all the bias windings in such manner that when the flip-flop device is in one condition a bias field is applied to all the cores in one direction, and when the flip-flop device is in the other condition the bias field applied to all the cores is reversed, first means for applying auxiliary bias fields to the cores of all but one of the pairs of cores of such magnitude as effectively to space apart the hysteresis curves of the pairs of cores successively by an amount not less than $H_2$, where $H_2$ is the magnetic field required to reverse the saturation of a core, second means for applying a train of alternately positive and negative driving pulses of defined volt-second product VT to the driving windings of all the cores in such manner that each pulse produces equal and opposite fields in the cores of each pair, whereby the flux of one of the cores is changed by a predetermined amount, means for causing the flip-flop device to reverse its condition in response to the next driving pulse which follows after a particular one of the cores has reached saturation, means for coupling at least one output circuit to the cores, and means for deriving from the output circuit an output pulse in response to given ones of said driving pulses.

12. A divider according to claim 11 in which the means for coupling comprises an output core having two oppositely wound bias windings connected in series with the respective bias windings of all the first-mentioned cores, and an output winding on the said output core connected to the said output circuit, said output pulses being generated in response to a reversal of the condition of said flip-flop device.

13. A divider according to claim 11 in which the means for coupling comprises at least one output winding coupled to at least one of the said cores, the said output pulse being generated in response to a reversal of the saturation of the last-mentioned one of the cores.

14. A divider according to claim 11, arranged to operate as a pulse distributor, comprising a plurailty of pairs of output circuits, each of which pairs is coupled to a corresponding one of said cores in such manner that an output pulse of given polarity is delivered to one output circuit of the pair when the saturation of the corresponding core is reversed in one direction, and that an output pulse of the same given polarity is delivered to the other output circuit of the pair when the saturation of the corresponding core is reversed in the opposite direction.

15. A divider according to claim 14 in which each core is provided with two oppositely wound output windings, and in which the two output circuits of the corresponding pair of output circuits are connected respectively to the said output windings through two respective rectifiers.

16. A divider according to claim 15 in which the said second means for applying comprises a driving core similar to the first-mentioned cores having a trigger winding connected in series with the driving windings of all the first-mentioned cores, and means for periodically reversing the condition of magnetic saturation of the said driving core, and in which the number of turns of each driving winding is equal to the number of turns of the trigger winding, or an integral multiple thereof.

17. A divider stage according to claim 5 in which the means for deriving the output pulse comprises a fourth core having two oppositely wound driving windings connected in series with the bias winding on the first-mentioned two cores, and an output winding connected to an output circuit, the said driving windings being so proportioned that the reversal of the condition of the flip-flop device causes the reversal of the saturation of the said fourth core.

18. A divider stage according to claim 9 in which the means for deriving the output pulse comprises a fifth core having two oppositely wound driving windings connected in series with the bias winding on the first-mentioned two cores, and an output winding connected to an output circuit, the said driving winding being so proportioned that the reversal of the condition of the flip-flop device causes the reversal of the saturation of the said fifth core.

19. A divider according to claim 11 in which the said second means for applying comprises a driving core similar to the first-mentioned cores having a trigger winding connected in series with the driving windings of all the first-mentioned cores, and means for periodically reversing the condition of magnetic saturation of the said driving core, and in which the number of turns of each driving winding is equal to the number of turns of the trigger winding, or an integral multiple thereof.

References Cited in the file of this patent

UNITED STATES PATENTS

| | | |
|---|---|---|
| 2,760,085 | Van Nice | Aug. 21, 1956 |
| 2,760,086 | Van Nice | Aug. 21, 1956 |
| 2,824,697 | Pittman et al. | Feb. 25, 1958 |